Patented Nov. 4, 1947

2,430,419

UNITED STATES PATENT OFFICE 2,430,419

WELDING ROD

Walter W. Edens, Wauwatosa, Wis.

No Drawing. Application February 2, 1945,
Serial No. 575,926

7 Claims. (Cl. 219—8)

This invention relates to welding rods and electrodes of aluminum bronze for use in the welding of bronze and the like.

The principal object of the invention is to provide a bronze welding rod or electrode that will produce weld deposits of higher strength and ductility and which will be suitable for the welding of high strength bronzes and the like.

Another object of the invention is to provide weld deposits of bronze that respond favorably to heat treatment with a gain in desirable physical properties.

Another object is to substantially prevent loss of nickel in transference of the metal through the arc.

According to the invention the welding rod or electrode is of bronze, preferably of aluminum iron copper composition, with additions of nickel and in some instances, manganese. It is substantially free of zinc, which is contained in ordinary manganese bronzes in high amounts.

The welding rod is of the general type disclosed in U. S. Letters Patent No. 2,238,392, granted to Milan A. Matush on April 15, 1941, and No. 2,320,676, granted to Clinton E. Swift on June 1, 1943, and has a covering composition preferably similar to the disclosed electrodes.

Such welding rods, without the additions of the present invention, produce weld deposits having a yield strength generally less than 40,000 pounds per square inch.

With the additions of nickel as specified herein it is possible to obtain deposits having yield strength generally in excess of 45,000 pounds per square inch.

For this purpose the welding rod should have the following range of compositions:

| | Per cent |
|---|---|
| Aluminum | 3.0 to 15 |
| Iron | 0.1 to 5 |
| Nickel | 0.1 to 6 |
| Manganese | 0.0 to 4 |
| Balance substantially all copper. | |

A typical composition giving excellent results is as follows:

| | Per cent |
|---|---|
| Aluminum | 10.4 |
| Iron | 3.0 |
| Nickel | 5.0 |
| Manganese | 1.25 |
| Balance | copper |

In aluminum bronzes the aluminum provides strength for the alloy and takes the place of other strength giving and hardening ingredients in other types of bronze.

The iron stabilizes the alloy and reduces the rate of the reactions in passing through critical temperatures and the like. Manganese has the same general characteristic as iron, only to a lesser degree. Neither metal need be employed in any substantial quantity, although the advantages of stabilization make it desirable to employ them. Manganese is also considered to be a deoxidizer.

Certain aluminum bronzes are low in ductility, and the addition of nickel in the present instance greatly enhances the ductility of the alloy, without interfering with the strength giving characteristics of the aluminum or the stabilizing characteristics of the iron.

The varying of the percentages of the several ingredients within the ranges set forth above have no final dependency upon each other, although it is preferred to have relatively high aluminum and nickel contents in the event high iron and manganese contents are employed.

Rods within the composition range above specified should be coated, preferably as set forth in the Matush patent above referred to, with cryolite, sodium fluoride and sodium silicate, with possible additions of filler material and the like.

It has been found that the addition of nickel and manganese as above set forth, to an aluminum bronze electrode greatly increases the yield strength of the weld deposit and its ductility.

Deposits made with rods of the composition specified have from 17 to 20% elongation in two inches in a tensile test specimen. When welding a high strength manganese bronze of 110,000 pounds per square inch ultimate strength it is possible to produce a deposit having an ultimate strength of over 100,000 pounds per square inch and with a ductility indicated in excess of 17% elongation in two inches.

The weld deposits from welding rods and electrodes of the present invention may be heat treated by suitable heating and quenching operations to enhance the tensile strength in the same manner as similar heat treatment of high strength bronzes and the like.

Ordinarily, the ductility is reduced with an increase in the yield strength of aluminum bronzes. However, with the present invention a small increase in ductility is obtained along with a very substantial increase in the yield strength.

The deposit is reasonably hard, having a Brinell hardness above about 180 (3,000 kg. load). Its electrolytic corrosion resistance is good.

By including the nickel in the alloy rod instead of in the covering and by employing silicon in the covering in the form of sodium silicate, it is possible to increase the recovery of nickel in the deposit and to prevent any substantial loss of nickel.

The invention is applicable to welding and to overlay deposits, and while the electrode is principally for metallic arc welding operations, it may be employed with similar advantages as a weld rod or filler rod in carbon arc or gas welding and the like.

Various embodiments of the invention may be employed within the scope of the accompanying claims.

I claim:

1. An aluminum bronze weld rod of the class described containing a substantial amount of nickel and having higher yield and ultimate strengths without sacrifice of ductility than aluminum bronze rods of substantially the same composition without the nickel.

2. An aluminum bronze weld rod of the class described containing substantial amounts of nickel and manganese producing welds of higher yield and ultimate strengths than aluminum bronze rods of substantially the same composition without the nickel and manganese.

3. An aluminum bronze welding electrode of the class described containing nickel in amounts up to about 6% and less than about 4% of manganese.

4. An aluminum bronze weld rod having a composition substantially within the following range: aluminum from 3 to 15%, iron from .1 to 5%, nickel from .1 to 6%, manganese from .0 to 4%, and the balance being substantially all copper.

5. An aluminum bronze weld rod having a composition substantially within the following range: aluminum from 3 to 15%, iron from .1 to 5%, nickel from .1 to 6%, manganese from .0 to 4%, and the balance being substantially all copper, said rod having a flux covering thereon containing principally fluorides and sodium silicate which react to effect transfer of the nickel to the metal deposit without substantial loss.

6. An aluminum bronze weld rod having a composition substantially within the following range: aluminum from 3 to 15%, iron from .1 to 5%, nickel from .1 to 6%, and the balance being substantially all copper.

7. An aluminum bronze weld rod having a composition substantially within the following range: aluminum from 3 to 15%, iron from .1 to 5%, nickel from .1 to 6%, manganese from .1 to 4%, and the balance being substantially all copper.

WALTER W. EDENS.

REFERENCES CITED

The following references are of record in the file of this patent:

UNITED STATES PATENTS

| Number | Name | Date |
| --- | --- | --- |
| 2,238,392 | Matush | Apr. 15, 1941 |